United States Patent [19]
Whitney

[11] Patent Number: 5,406,109
[45] Date of Patent: Apr. 11, 1995

[54] MICRO ELECTRONIC ELEMENT AND METHOD OF MAKING SAME

[76] Inventor: Julie G. Whitney, 11201 Paddock, Richwood, Boone county, Ky. 41049

[21] Appl. No.: 967,803

[22] Filed: Oct. 28, 1992

[51] Int. Cl.⁶ ............................................. H01L 23/58
[52] U.S. Cl. .................................... 257/467; 257/419; 257/466; 257/522; 257/528; 257/619
[58] Field of Search .............. 257/467, 419, 466, 522, 257/528, 619

[56] References Cited

U.S. PATENT DOCUMENTS

| | | | |
|---|---|---|---|
| 4,533,898 | 8/1985 | Sauermann | 257/467 |
| 4,706,061 | 11/1987 | Johnson | 257/467 |
| 4,930,347 | 6/1990 | Henderson | 73/189 |

OTHER PUBLICATIONS

Thesis of Gregory N. Burton; Univ. of Cincinnati, Dec. 1981.
Thesis of Julie Ann Gordon Whitney; Oct. 1992.

*Primary Examiner*—Edward Wojciechowicz
*Attorney, Agent, or Firm*—Joseph G. Nauman

[57] ABSTRACT

A miniature electronic element is provided formed of and within a single crystal of semiconductor material on which are formed top and bottom surface layers of an oxide of the semiconductor material, and including at least one isolated island of semiconductor material formed in the remaining material between the top and bottom surface layers. Contact members may be attached in predetermined spatial relation to at least one of the top and bottom surface layers and extend through the one surface to the island of material connecting thereto in spaced relation, whereby the material of the island between the contact members provides an electrical path of predetermined value between the contact members. An isolating chamber (or chambers) is formed between the surface layers around the isolated island of material to provide thermal isolation to the island of material. A temperature sensing device is described using such miniature electronic sensing element, by applying an electrical potential across the leads to produce predetermined heating of the island of material, whereby changes in ambient conditions around the sensing element will be reflected as resistance changes in the island of material. Also described are novel methods of making such miniature electronic elements, including novel ways to form islands of semiconductor material within a crystal thereof.

5 Claims, 7 Drawing Sheets

WINDOWS
17
18

10

CONTACTS
17
18  10

10
CONTACTS tunnel etched area
hole
metal

MICRO ELECTRONIC ELEMENT AND METHOD OF MAKING SAME

This invention relates to the art of micro machining using miniaturized photolithographic etching techniques, and particularly to the method of making a micro sized flow sensor by shaping the interior of a single crystal silicon wafer.

BACKGROUND OF THE INVENTION

The development of the art of micro photolithography in connection with the manufacture of integrated circuits, for example LSI circuits has lead to a revolution in commercial and consumer electronics and related devices. In general, such circuits are formed by repeated exposure of a surface of a semiconductor chip to steps of producing patterns on the chip surface by coating the surface with a suitable photosensitive resist, using masks to expose the resist to the complex patterns and to create etching resist patterns, then chemically etching the surface pattern to form a "layer" of circuit elements and connections. Such well known procedures operate substantially on one or both (front and back) of the major chip surfaces. In combination with these steps, there may be selective coating of patterns onto the chip surface(s).

An extension of those general techniques is described in U.S. Pat. No. 4,930,347 issued 5 Jun. 1990 and assigned to the University of Cincinnati to produce a microanemometer. This and other various attempts have been suggested in the prior art to construct microminiature electronic elements, such as precision resistors, for use as sensors adaptable to signalling the flow of fluids through conduits, vents, etc., but these devices have traditionally utilized techniques which build upon or cut into the surface of a crystal wafer. Problems are encountered with sufficient thermal isolation. These techniques also encounter problems of attachment of exterior elements to a surface of the wafer, and in general to increasing the bulk of the resulting element, whereas the desired result is to minimize such bulk, and to present as small as possible an exterior with a smooth as possible a surface configuration.

A technique for selective internal etching (chamber etching) is generally described in a master's thesis by G. Burton, December 1981, which is on file in the Engineering Library of the University of Cincinnati, located in Cincinnati, Ohio. This paper describes the steps to be used for such chamber etching in a single crystal silicon wafer, but does not recognize nor address the thermal transfer considerations that may be important in the building of such elements. The Burton thesis describes only briefly the chamber etching process, showing some small bridges created with it. The doping concentration was given in terms of time with a $PClO_3$ source. Since the time of Mr. Burton's work, use of the $PClO_3$ gaseous phosphorous source has been recognized as dangerous, and instead many fabricators use a solid source phosphorous wafer, such as made by The Carborundum Company, as the diffusion source.

The amount of phosphorous diffused into a silicon wafer from a solid source is a function of several things, namely the temperature of the diffusion, the length of time of the diffusion, and the type of source wafer. Since the Burton thesis recorded doping concentrations in terms of time in diffusion for the $PClO_3$ source, it was necessary to compare that doping information to what might be currently obtainable with a solid source. Therefore, a series of chamber etching trials were performed to investigate what procedures were needed to use the chamber etching technique in a production environment.

SUMMARY OF THE INVENTION

The present invention uses the principles of such chamber etchings and through a unique series of steps provides a method of treating one or more micro-elements from a single crystal by selectively etching and coating portions of the crystal. The method allows the creation of various forms of micro-elements within the original bounds of a single silicon crystal wafer, and in particular allows the creation of novel thermally/electrically isolated micro-electronic elements, such as precision micro-resistors, which allow accurate sensing of temperatures (or temperature differentials) in small passageways, tubes or other conduits, etc. through which fluids may flow, and thereby provide a means of sensing the rate of flow of such fluids, without intruding upon or impairing the flow itself.

Broadly described, the process of the present invention encompasses ten major steps. There are additional steps involved, which are per se known and are part of sequences used to oxidize and the etch Silicon crystals. For purposes of simplifying the summary description, these additional repeated steps or sub-routines are not included in this summary description of the major steps. The major steps are:

1. a single crystal of Silicon, for example a flat wafer of about 47 to 50 mm. in diameter and thickness of 250 microns is oxidized to produce silicon dioxide $SiO_2$ surfaces on the front and back of the wafer, the thickness of the oxide surfaces is typically about 0.4 microns;

2. the oxide is removed from one surface, for example the back surface, to define a window area of predetermined size;

3. the window area is etched to form a diaphragm region of predetermined thickness, for example 50 microns;

4. the exposed Silicon surface of the window area is oxidized to create an oxide surface, for example of about 1 micron thickness;

5. using photolithography techniques, a number of small window areas are created, spaced apart in a predetermined pattern, on the front side of the wafer;

6. all or selected ones of the small window areas are doped with phosphorous;

7. a thin oxide coating (e.g. 0.2 micron) is created on the small window areas;

8. photolithographic steps are used to create small openings in the small window areas, suitable for use with subsequent chamber etching techniques to create the internal isolated resistor element;

9. spaced apart metal contacts are created, including leads extending to certain ones of the small window areas, as by an evaporative coating process of Aluminum onto the selected contact regions; the metal contacts are connected to the isolated region or island of Silicon, which forms a temperature sensitive electrical element;

10. using chamber etching techniques through the other small window areas, open spaces are created between the oxide layers of the window area to define at least the sides of an island or isolated area of Silicon to become the temperature sensitive resistor element; part of the isolation of this element may optionally be achieved through etching of holes at ends of the element.

Chamber etching can be accomplished using a 50/50% solution of hydrazine and water. Alternatively, a two step chamber etching may be used comprising a first etching step using first an anisotropic etchant, such as KOH, followed by a second etching step using an isotropic etchants, such as EDP.

A resistor (more precisely a thermistor) prepared as just described is useful as a flow sensor, since due to it size and configuration it can be placed in proximity to (actually within) a flow of gas without appreciably affecting (modifying) that flow. It is also possible to utilize the invention to produce other micro sensors. The $SiO_2$ on both top and bottom of the thermistor island acts as an electrical insulator, and also as a thermal insulator.

It is therefore a principal object of the invention to provide a miniature electronic element formed of and within a single crystal of semiconductor material on which are formed top and bottom surface layers of an oxide of the semiconductor material, and including at least one isolated island of semiconductor material formed in the remaining material between the top and bottom surface layers, and contact members attached in predetermined spatial relation to at least one of said top and bottom surface layers and extending through said one surface to said island of material and being connected thereto in spaced relation whereby the material of the island between said contact members provides an electrical path of predetermined value between the contact members to provide such a miniature electronic element wherein an isolating chamber (or chambers) is formed between the surface layers around the isolated island of material to provide thermal isolation to the island of material; to provide a temperature sensing device using such a miniature electronic sensing element, by providing means for applying an electrical potential across the leads so as to produce predetermined heating of the island of material, whereby changes in ambient conditions around said sensing element will be reflected as resistance changes in the island of material; to provide novel methods of making such miniature electronic elements; and to provide novel ways to form islands of semiconductor material within a crystal thereof upon the surfaces of which are formed relatively thick surface layers of an oxide of the semiconductor material.

Other objects and advantages of the invention will be apparent from the following description, the accompanying drawings and the appended claims.

DESCRIPTION OF THE PREFERRED EMBODIMENT

Figure 11:
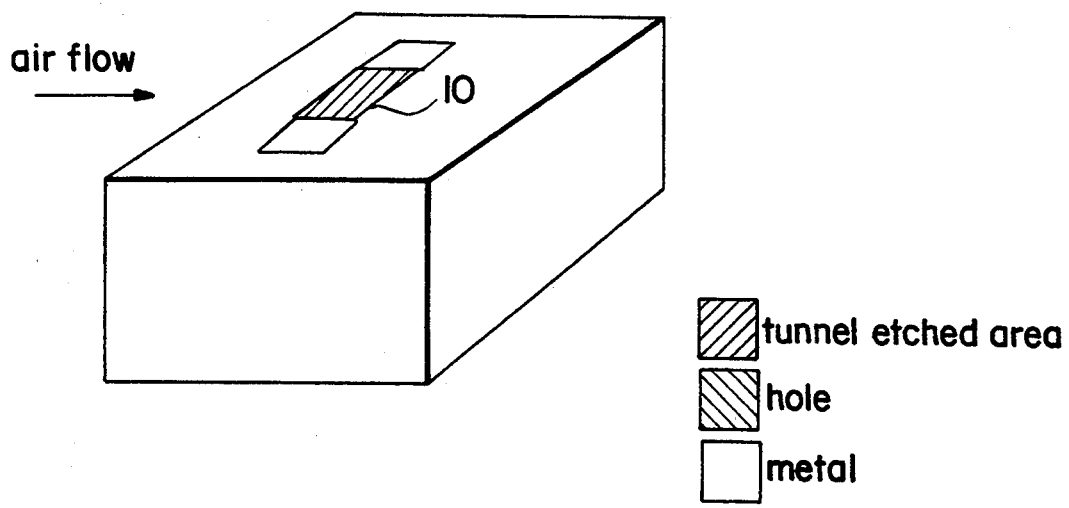
FIG. 11 is a schematic perspective illustration of a single resistor thermal flow sensor according to the invention, located in a typical gas flow which is to De measured quantitatively by its cooling effect on the electrically energized flow sensor.

The invention provides a Silicon micro flow sensor which measures cooling effect of a flow of fluid (e.g. a gas flow passing the sensor) as a change in electrical resistance of a micro size bulk Silicon thermistor 10 which is uniquely formed within a crystal 12 of Silicon. Single resistor or half bridge or full bridge resistor configurations are possibles, but for purposes of initial explanation, the single resistor configuration is shown in FIG. 11. In some configurations the half bridge will be preferred, with one thermistor used to achieve temperature compensation.

The micro thermistor(s) are provided with a unique thermal isolation structure or arrangement, which separates the active thermistor element(s) 10 from the remaining bulk of Silicon in the crystal 12 from which the thermistor(s) is isolated and in which the thermistor(s) is contained and supported. This decreases the amount of power needed to achieve good sensitivity, and also can decrease response time. This also enhances repeatability and stability of the output.

Figure 12:
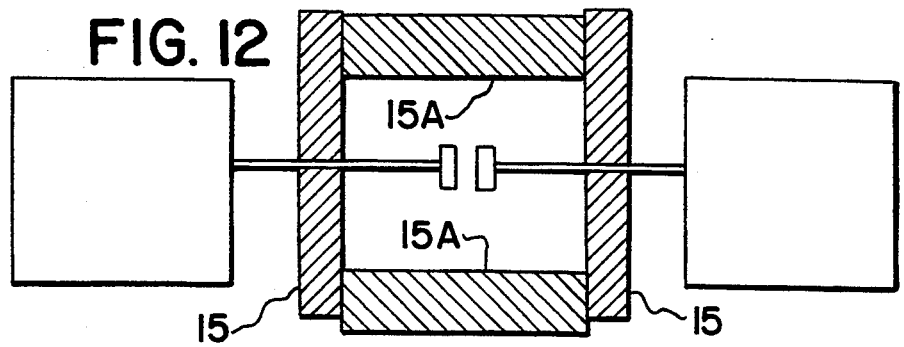
FIG. 12 shows one form of the invention wherein the isolated internal thermistor element is surrounded by chambers, some of which are created by chamber etching and some of which are produced by holed produced with conventional etching steps.
Figure 13:
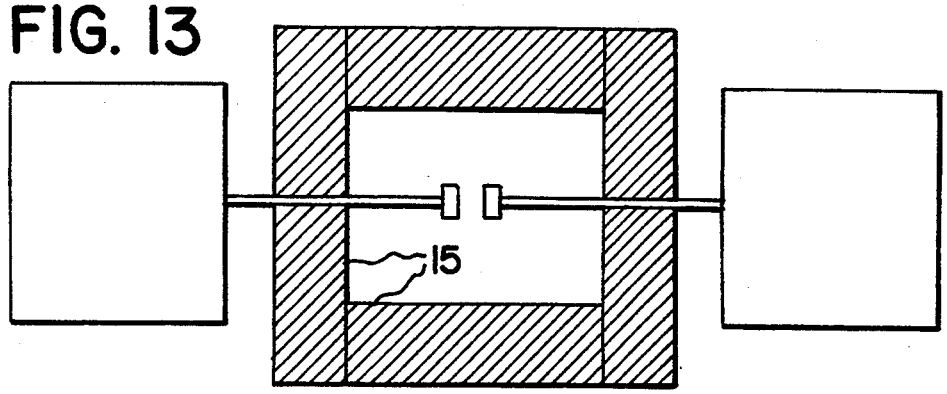
FIG. 13 shows another form of the invention wherein the isolated internal thermistor element is surrounded by chambers entirely are created by chamber etching.

The thermal isolation structure provided by the invention includes relatively large cavities 15 of dead air space sandwiched between two thin Silicon oxide membranes or layers 17, 18. In one embodiment (FIG. 13), the air cavity 15 (or cavities) surrounds the isolated resistor element (or island). In another embodiment (FIG. 12), air cavities 15 are created at two ends of the island resistor element 10, while large holes 15A are formed through the Silicon along the sides of the island resistor element. In each, thermal isolation is enhanced because heat attempting to escape from the island resistor element by conduction to the rest of the crystal structure must pass through (or substantially through) the oxide membranes 17, 18. These membranes have high resistance to heat conduction because of their relatively low thermal conductivity and because of their small cross-sectional area.

Method of Fabrication

Certain preparation steps are involved repeatedly in the method of fabricating the device according to the invention. A single crystal Silicon wafer is base cleaned to assure it is free of contaminants for the succeeding steps performed on it. The crystal is then oxidized, i.e. a layer of $SiO_2$ is "grown" on the front and back faces of the crystal, preferably these layers being in the order of 0.4 microns thick.

Typically, base cleaning is accomplished by boiling a wafer (at 70° C.) in a cleaning solution of 200 ml. deionized water, 50 ml. of ammonium hydroxide, and 50 ml. of hydrogen peroxide for fifteen minutes. The wafer is then rinsed in deionized water and dipped for 10 seconds in a 2% hydrofluoric acid solution, rinsed again, and then dried with nitrogen.

Oxidizing can be accomplished by loading the wafer into an oxidation boat and placing it in the mouth of an oxidation furnace for about five minutes to come to temperature. Then boat is then moved to the center of the furnace which is kept at 1000° C. Oxygen is fed to the furnace chamber at a constant rate of 50 liters/hr. The wafer is left in this dry oxidation environment for thirty minutes and then the path of oxygen changed so it bubbles through hot deionized water (95° C.) before entering the furnace. This wet oxidation proceeds for sixty minutes, and then the path of the oxygen is changed again and the wafer continues in a dry oxidation for a further thirty minutes. At the end of the last dry oxidation, the wafer boat is moved to the front of the furnace and allowed to cool for five minutes before unloading.

Figure 1A:
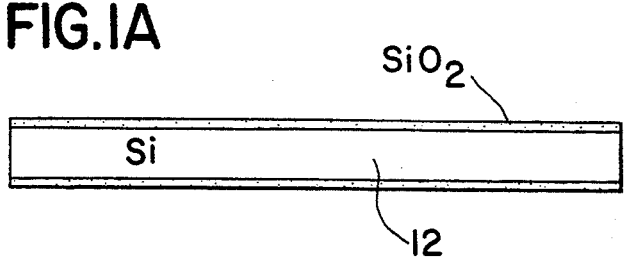
FIG. 1A represents a substantially enlarged diagrammatic cross-section through a Silicon crystal which has been oxidized on it front and back surfaces.
Figure 1B:
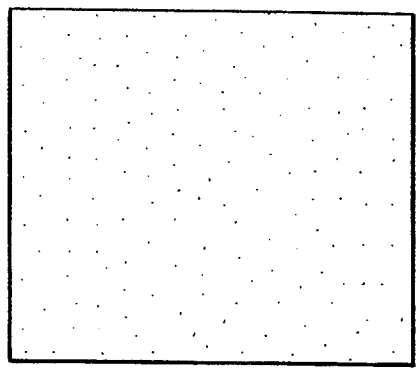
FIG. 1B is a plan view of the front of the crystal shown in FIG. 1A.
Figure 2A:
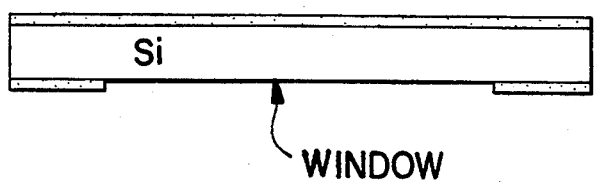
FIG. 2A is a cross-section view showing oxide removed from a window area on the back side of the crystal.
Figure 2B:
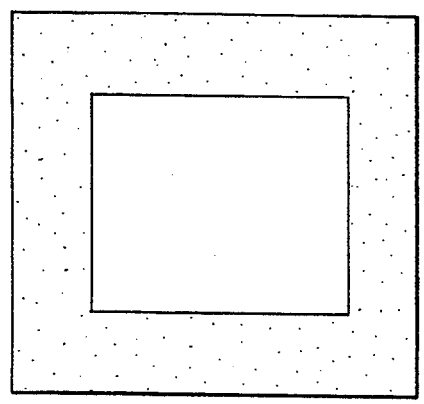
FIG. 2B is a view of the back side showing the window area.
Figure 3A:
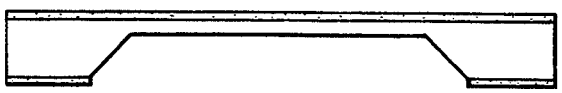
FIG. 3A is a cross-section view showing the reduction in thickness of the window area of the crystal to define a thin diaphragm area of predetermined thickness.
Figure 3B:
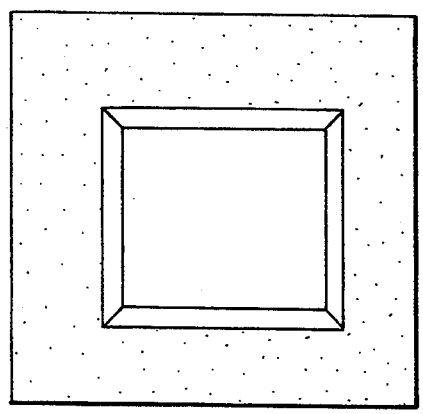
FIG. 3B is a view showing the extent of this diaphragm area.

Next, photoresist is applied to the back side of the wafer and baked thereon. A backside mask having a diaphragm window configuration (see FIG. 2B) is aligned with the wafer over the photoresist, and the resist is exposed to suitable radiation (typically an ultraviolet light source). The photoresist is developed and hard-baked, then the front side of the wafer is coated with photoresist, which is dried. Next, a buffered oxide etchant is used to remove the diaphragm window area, which was uncovered in the development. This leaves a diaphragm window area of precise predetermined configuration (FIG. 2B) which is etched in an anisotropic etchant for a predetermined time, until the diaphragm structure (front oxide layer plus lesser thickness of Silicon beneath) is of desired thickness, preferably about 50 microns.

Figure 4A:
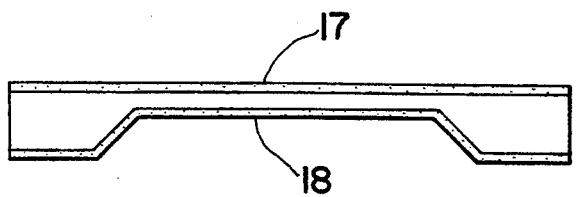
FIGS. 4A and 4B are view showing the diaphragm area after oxidizing.
Figure 4B:
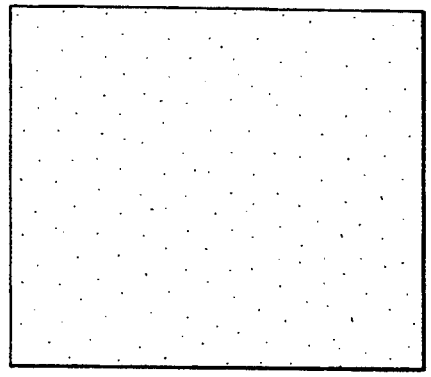
Figure 5A:
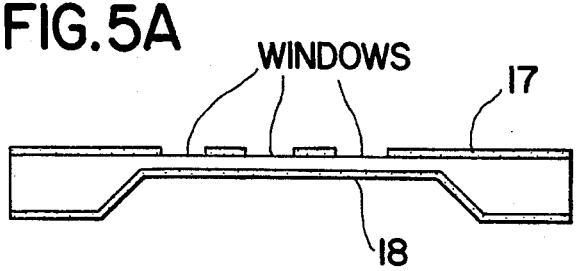
FIGS. 5A and 5B show the cross-section and front side plan of the crystal after photoetching of windows through the front oxide surface.
Figure 5B:
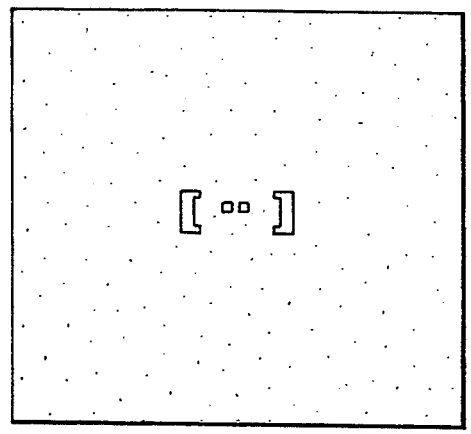
Figure 6A:
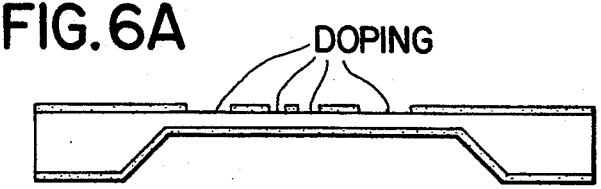
FIGS. 6A and 6B show the effect of doping the window areas.
Figure 6B:
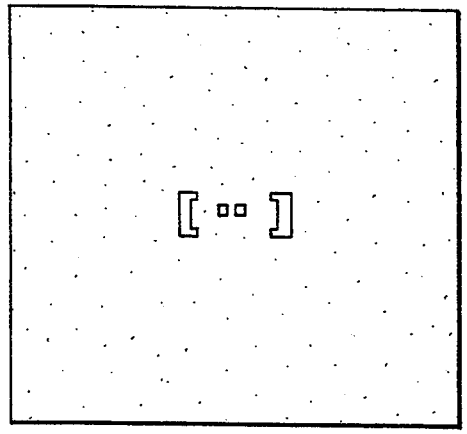

The wafer is then base cleaned (see above) and again oxidized to grow a back oxide layer of about 0.6 to 1.0 micron thickness on the back side window area (FIGS. 4A and 4B).

The next step employs a further mask and photolithographic exposure, development, and photoresist removal steps to create small openings through the front side oxide layer, for use in phosphorous doping of the upper portion of the Silicon beneath the front oxide layer.

Figure 7A:
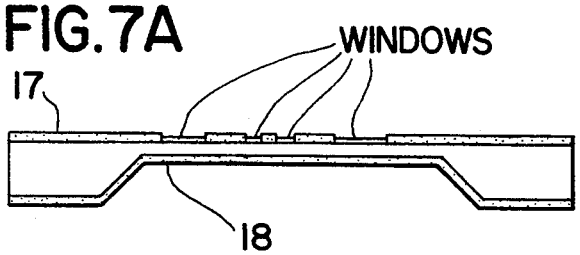
FIGS. 7A and 7B show the formation of a thin oxide coating over the doped window areas.
Figure 7B:
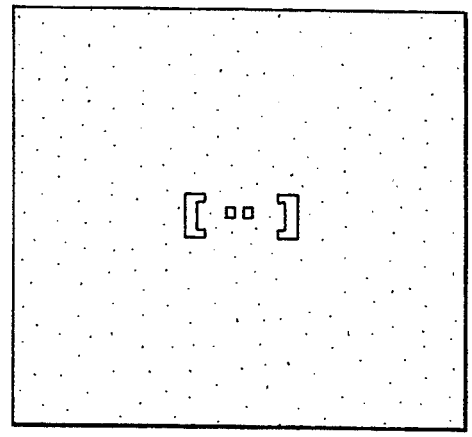
Figure 8A:
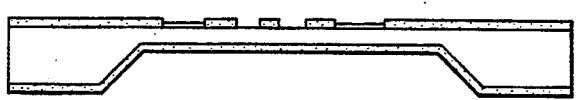
FIGS. 8A and 8B show the thin oxide layer grown over the doped chamber etching areas.
Figure 8B:
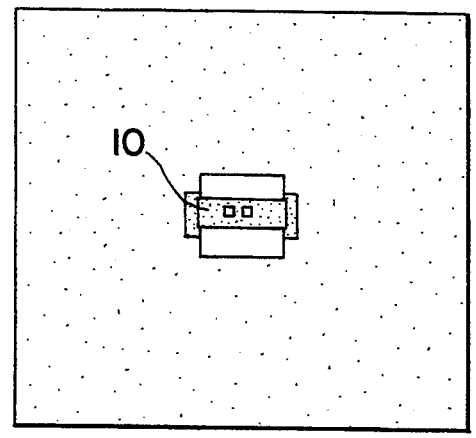

Before doping with phosphorous, a base clean step again is performed. The wafer is placed in a furnace with a phosphorous source, and the small window openings in the front oxide layer are doped in preparation of both electrical contacts and for chamber etching the isolation chambers between the oxide layers in the large window area. This is followed by a further base clean operation, and then growing of a thin oxide layer (about 0.2 microns) on the front surface of the wafer, over the small window openings (see FIGS. 7A and 7B).

The next step is further photolithography. A photoresist is spun coated onto the front face of the wafer and softbaked. A mask defining chamber etching and electrical contact areas is fitted to the front face, the photoresist is exposed, developed, and hardbaked. Then the back side of the wafer is coated with photoresist which is allowed to dry. The oxide is then removed from the defined window openings with a buffered oxide etchant, and the photoresist is removed with a solvent.

Figure 9A:
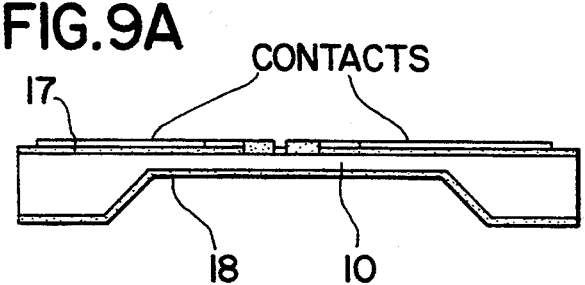
FIGS. 9A and 9B show the addition of metal contacts to the front surface of the crystal.

Next, a photolithography step is performed to defined the areas for deposit of metal, to form the electrical contacts. Again, photoresist is spun onto the front wafer surface, then softbaked. A mask defining the contact areas (see FIG. 9A) is aligned to the wafer front face and the resist is exposed. Next, the wafer is soaked in Cholorobenzine for about five minutes, then the photoresist is developed. A thin metal coating (Aluminum has been successful) is condensed onto the front surface of the wafer by an evaporative coating process, after which a solvent is used to remove photoresist and any unwanted metal. At this time metal is located in the electrical contact windows, but the chamber etching windows are open.

Figure 9B:
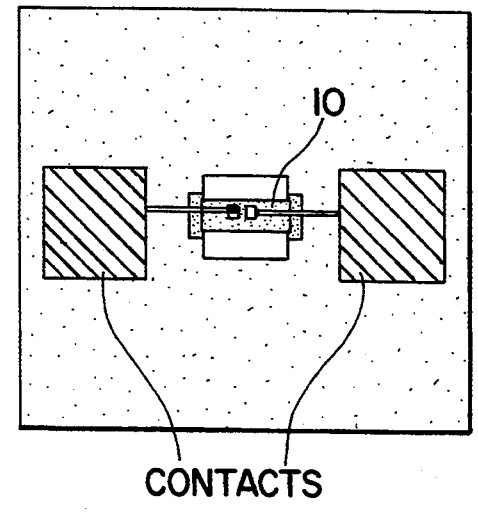
Figure 10:
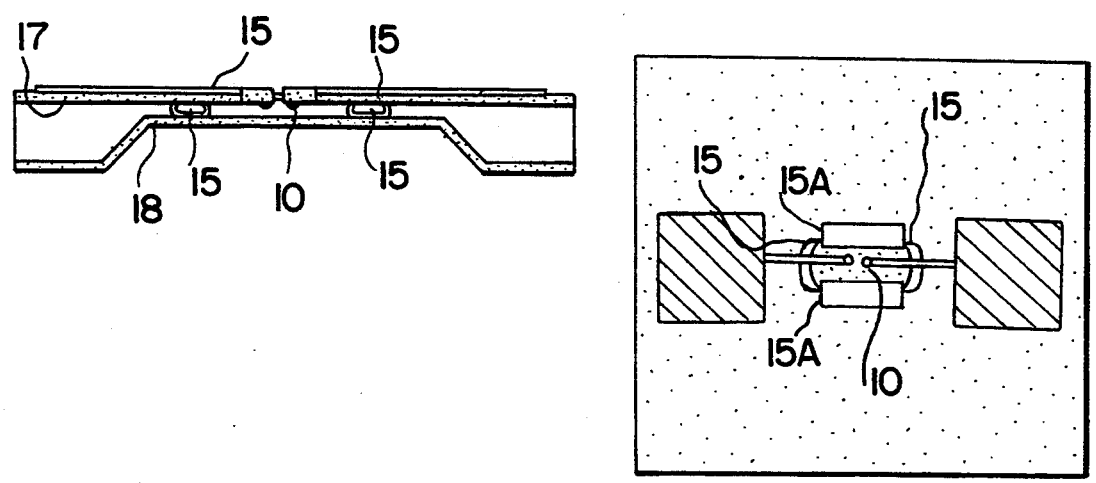
FIG. 10 shows the result of the chamber etching operation to isolate the internal island of silicon beneath and between the windows.

The wafer is placed in a solution of 50% water and 50% Hydrazine, to hollow out cavities by chamber etching through the windows provided for that purpose. These cavities extend around at least two opposite side of the to be isolated silicon resistance member, such as the end regions beneath the metal electrical contact leads; see FIG. 9B. Additional etching through the windows can form openings along the side regions of the internal isolated resistance member. It is also possible to form all four cavities using the chamber etching technique.

When the cavities are fully formed, the wafer is removed from the solution. This leaves an electrical micro resistor element sandwiched between the front and back silicon oxide layers,, and totally isolated from the remainder of the silicon between these layers. The thickness, width, and breadth of this element are precisely determined by the process, so the electrical resistance of any such element can be reproduced with precision and close tolerance. The wafer is then sintered. It is placed in a Low temperature (about 450° C.) oven for thirty to forty-five minutes to create good electrical contact between the surface deposited metal and the wafer. If multiple devices are produced from a single wafer, they can now be separated, as by sawing, and then lead wires can be bonded to the metal electrical contact areas.

Modified Chamber Etching Step

In recognition of the dangerous nature of hydrazine, an alternative procedure has been developed for accomplishing the desired chamber etchings, In this alternative procedure, after the windows are formed in the $SiO_2$ layer, a first etching step is performed using first an anisotropic etchant, such as KOH, followed by a second etching step using an isotropic etchant, such as EDP. The etching of chambers within the material between the oxide layers can be accomplished in this fashion with less concern for hazard protection against the etchant materials. In this modified procedure phosphorous doping for chamber etching is not required, however it is used for formation of the electrical contacts.

Features of the Invention

The thermal isolation structure above described has been found to allow only about 3% of the thermal snorting found in flow sensors such as constructed according to said U.S. Pat. No. 4,930,347. Also, the device of this invention remarkably demonstrates the importance of thermal isolation to a device of this type. Actual devices produced according to the invention have required only 15 mW of power to give 15 mV/cm/sec sensitivity, as compared to a flow sensor version of the device in said U.S. Pat. No. 4,930,347 (without gold doping) which has been noted to require about 500 mW of power to give a sensitivity of 30 mV/cm/sec, while operating at a much higher temperature.

The process of the invention requires a wafer to be shallowly doped with phosphorous wherever the chamber etching is required. The quantity of phosphorous available to be etched has been observed to affect the chambering process. Higher phosphorous contents cause the chambers to etch quickly, but also create underetching in non-phosphorous doped etching areas. Too little phosphorous can slow the chambering process until it is undetectable during reasonable etch times. The chamber depth will increase every time the wafer is placed in the etching solution, although the rate of etching decreases somewhat as the chamber depth gets greater because of the difficulty of getting fresh etchant to the active surface.

Chamber etching appears to give off to the etching solution some sort of etch enhancer, and chambering occurs all around the etch opening, even in non-doped directions, although at a reduced rate. Thus, the present invention developed the information that windows are best designed to be opened in the center of the chambering area, rather than at an end. Two windows can expect to connect through a chamber etch if they are no more than 40 microns apart with a reasonable etching time, generally under two hours depending on the freshness of the etchant. The same strategy is used for the combinations of anisentropic followed by isentropic etchants. Etch times in excess of two hours will produce even longer chambers, but the quality of the etched wafer begins to suffer due to imperfections in the masking oxide such as pinholes or scratches.

The chambering etch rate is such that secondary planes generally keep up with the advancing chamber surface, so the size of the initial window opening should kept small, as that size will be propagated down the chamber. Chamber etching is a controllable and repeatable process, given good surface preparation at the time of phosphorous doping and final etching. Chamber length variation was observed to be less than 10 $\mu$m for the deepest chambers etched.

Chamber etching has been shown by this invention to be incorporatable into micro machined constructions for isolation purposes. Other devices than resistors, requiring similar isolation or oxide bridges for structures, can use this method in their designs. Only standard micromachining equipment and materials are needed. Since silicon oxide is also a good electrical insulator, the chamber etching process can be Just as useful for electrical isolation as for thermal isolation.

A neat transfer model of the micro flow sensor revealed some interesting effects while creating a microheat transfer device. The small size of the electrically heated resistor element, and therefore its small surface area, make it difficult to achieve sufficient heat transfer into the surrounding air (e.g., gas flow). Diffusion effects start to play a major role in the heat transfer and traditional boundary layer theory is no longer strongly applicable. Difficulty in getting heat into the surrounding air meant that losses to conduction became extremely significant, and methods for thermally isolating the heated region became increasingly important.

The heat which can be absorbed by the passing gas is also a function of the properties of the gas itself. Changes in gas composition will effect the output reading of the device for the same flow rate. The difference is easily predictable if the properties of the gas are known and the device can be calibrated to read volumetric flow rate for any given pipe configuration and gas composition.

Work with the invention has indicated that it is a good practice to change the hydrazine around every 10 hours of etching or if contamination was suspected. When the hydrazine was changed regularly, etch stop problems disappeared, and wafers doped as heavily as 1000° C. for 1 hour were capable of being chamber etched over 50 $\mu$m without stopping.

Figure 14:
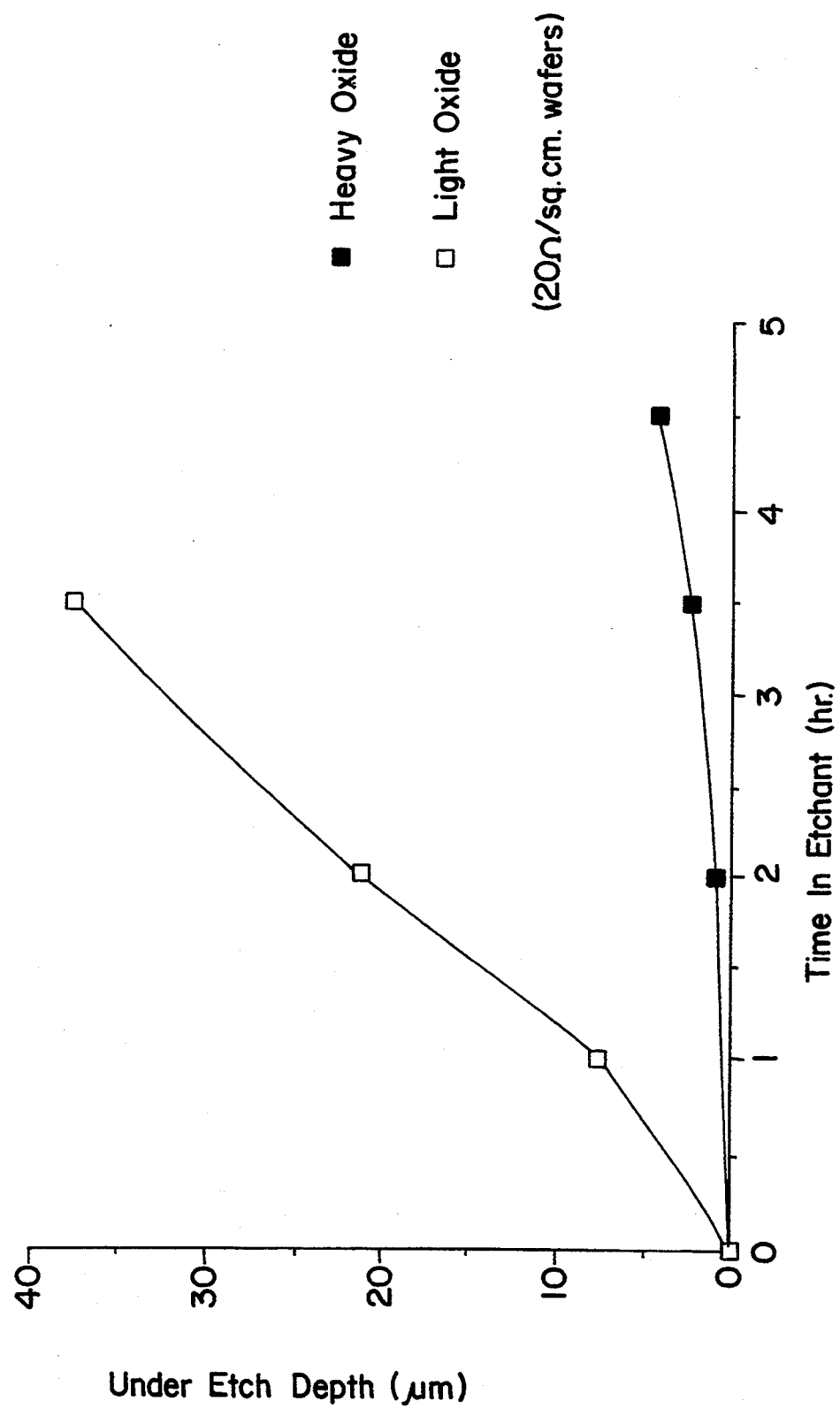
FIG. 14 is graph showing the effect of residual phosphorous doping on the chamber etching step.

When wafers were doped with small, quantities of phosphorous (e.g. at less than 950° C. for 1 hr) the chamber etching was note, to be reduced drastically. The same loss of chambering ability could be repeated if a reasonable quantity of phosphorous was diffused into the Silicon, but then the oxidation done after the doping was great enough to absorb most of the phosphorous doped silicon into the oxide. FIG. 14 shows the etching vs. time for a 10 $\Omega/cm^2$ wafer which was doped for 1 hr at 950° C.; then over the doped regions there was grown a 30 min. dry, 60 min. wet, 30 min. dry oxide, for a thickness of about 0.4 $\mu$m. The doped areas were observed to be taken up in the oxide growth, and the result was extremely poor chambering. At the end of 3.5 hours total etching time the wafer with the lighter oxide had almost 30 $\mu$m more of chamber etching than the heavily oxided wafer.

Since the oxide is used as a structural element for the thermal isolation structures this could place a limit on the lengths of membranes feasible for holding up bulk silicon resistors. However, there are two ways to avoid this limitation. One way is to do the phosphorous doping with ion implantation rather than a surface deposition. Ion implantation will put the heaviest concentration of phosphorous under the surface of the silicon, leaving more silicon available for oxide growth. A second way is to use oxide grown on the backside of the device for more of the structural support. This method of increasing the thickness of the backside oxide layer for structural integrity was used guide successfully in manufacturing sensors according to the invention.

It has also been observed that the chamber etch technique requires the right amount of phosphorous in the available doped silicon. The etch rate is not only a function of the amount of phosphorous placed in the wafer, but of the amount left over in nonoxidized silicon after the second oxidation, as mentioned above (see FIG. 14). An oxidation cycle of 10 minutes dry, 30 minutes wet, and 10 minutes dry oxidation was observed to have a good combination of adequate oxide coverage and adequate doped silicon available to etch.

The etch rate was observed to be a function of the amount of doping and the depth into the chamber that the etch had already progressed. As mentioned before the most likely reason for decreasing rates as the chamber progresses is the difficulty in getting fresh etchant to the active area. When the wafer is first placed in the etchant, initial etching is downward. As the etch pit from the chamber starting hole increases, a larger cross-section of phosphorous is exposed on the sidewall and chambering begins. The chambering progresses rapidly while the etchpit is close enough to the active chambering surface than an exchange of new and used etchant is easy. As the chamber gets deep the rate slows down again.

Thermal Isolation

One of the important features of the invention is that chamber etching can be used to enhance thermal isolation. While chamber etching removes the silicon from between two layers of silicon dioxide, the oxide is needed to hold the device together and some heat is lost from the hot isolated resistor through the oxide. The amount of heat lost in this manner is a function of the cross-sectional area of the oxide and the length the heat has to travel before it reaches the base silicon. The thermal conductivity of the silicon dioxide is much less than that of the silicon, 1.4 W/m° C. compared to 125.6 W/m° C., but it is not negligible. Another source of heat loss to conduction is through the metal leads and out to the main device.

The metal leads appear to be significant in the limiting structure for thermal isolation. In parallel with the metal leads is the thermal resistance of the oxide membranes. Two strategies, resulting in the two described embodiments, were used for thermal isolation. One embodiment uses a chamber etch structure which extends all the way around the sides and ends of the isolated resistor material, and the other or second embodiment uses a combination of a chamber etch structure at each end of the resistor material and holes along the length of each side of the resistor material. The best thermal isolation was achieved with the second embodiment. The net thermal resistance to conduction for the two designs was calculated at $0.994 \times 10^5$ °C/W for the chamber etch structure (first embodiment) and $1.2 \times 10^5$ ° C./W for the combination of chamber etching and etched holes (second embodiment). Either of these is a sizeable improvement over current devices (as in U.S. Pat. No. 4,930,347) which have a thermal resistance to conduction in the order of 210° C./W. Also, the enhanced isolation results in heat lost, to conduction being about equal to heat lost to convection, an improvement over 100 to 1000 times more.

Manufacturing Considerations

Manufacturability of the flow sensor of the invention was an important consideration in its ultimate design. Several aspects of manufacturing were specifically addressed and incorporated into the new device.

Easy Alignment

Photolithography takes time and skill on the part of the processor to produce a good result. The most difficult alignments are aligning front and back features and aligning very fine detail or tight tolerances. When alignment is not correct, the photoresist must be stripped off of the wafer, and the entire lithography process started again. This adds a minimum of 1.5 hours to the device processing time. Difficult alignments also take more time on the aligner apparatus.

The sensor design of the invention allows for large tolerances on all dimensions, so larger misalignments are still acceptable. The front to back mask is especially tolerant of large movements. The design is also insensitive to misalignments with respect to crystal orientation. To aide in alignment large die openings can be left in all masks, as is known in the art. These windows can be aligned with the unaided eye and speed up alignment considerably.

Diaphragm thickness variation

A timed etch technique was initially employed to control diaphragm thickness. This appears not to be the best method as etch rates, especially in EDP are constantly changing. Very thin diaphragms take constant monitoring.

By making large etch-through holes, diaphragm thickness could vary considerably and still produce good devices. In addition the diaphragm can be left thicker, which increases structural integrity for both the finished device and the wafer in process. A diaphragm thickness in the order of 50 microns has provided successful and consistent results.

Compensation for variations in chamber etching

Chamber etching begins from small holes located all over the surface of the doped region to be chambered. The holes are located about 40 microns apart, so each hole must etch (propagate) 20 microns before the chambers connect. Compensation structures are placed on the corners of all of the silicon resistor islands when these secondary corners are exposed as the chamber etching finishes. The locations of the etch starting holes were chosen so the secondary planes would not be exposed until the very end of the chamber etching. In addition the resistor part of the island is the very center portion, and a fair amount of extra etching can take place before the resistor itself is jeopardized.

Number of Masks

A rough approximation of the difficulty of manufacturing a device of this kind is the number of masks required to make it. In a very real ways, since every mask represents an additional photolithography, the number of masks are indicative of the time required to make the device. The number of masks for both the new sensor and for the old sensor device is 4.

Time to make devices

Gold doping in the prior art flow sensor has been replaced by chamber etching in the sensor produced by this invention. The phosphorous doping required for the chamber etching is also used to create the doped area for the resistors, so in this manner a doping step is eliminated. Instead, the present invention requires a second oxide to be grown. Unlike sensitive gold doping processes, the chamber etching process is robust, operating successfully under a variety of doping times and temperatures. It is also a uniform process, as has previously been explained. It appears that processing time for the sensors of this invention is approximately one-half that required for the prior art sensors.

Breakage

Some prior art flow sensor designs have been found susceptible to breakage, both during processing and during bonding. By contrast, according to this invention the wafer first is mounted on an outside rim which is cut apart. The rim is not exposed to any secondary plane etching and therefore the problems of sharp points rather than pads for bonding which is characteristic of the old design. Thus, the added processing step of wafer thinning can be eliminated and the wafer is stronger in the present invention. Some prior art sensor devices are held together by thin resistor bridges, whereas the sensors of the present invention are held together by a relatively massive exterior.

Another manufacturing technique is employed to increase the strength of the wafers. The first oxide etch opens the windows on the back side of the wafer to create the membranes. Before this oxide etch step, the non-patterned side (front side) of the wafer must be painted with photoresist to prevent removal of the oxide on that side. At that time a ring of photoresist may be painted around the edge of the wafer on the patterned or back side. This ring prevents oxide removal in this area and eventually prevents etching next to the edge of the wafer. An unetched ring all of the way around the wafer greatly enhances its strength. This result can also be accomplished by a mask modification.

Sensitivity Performance

A flow sensor device according to the invention has been tested in several configurations. The test fixture was a computer controlled mass flow controller, which regulated shop air into the fixture at rates between 0 slpm (standard liters/min.) and 20 slpm. The air was channeled into a baffled expansion chamber and through a static mixer and flow straighteners before it passed the sensor device.

The current to the sensor device was controlled by a constant current source and the output of the device was the voltage. The sensor was run at 5 different current values, from 1 mA to 5 mA. For each current value the flow was changed from 0 slpm to 20 slpm in increments of 4 slpm for a total of 6 different flow rates. Each current level represented ½ hour of testing, with data being taken every 8 seconds. After the device was checked at all current levels, the current was taken to zero for four hours and then the test was repeated, on different days to determine repeatability.

Figure 15:
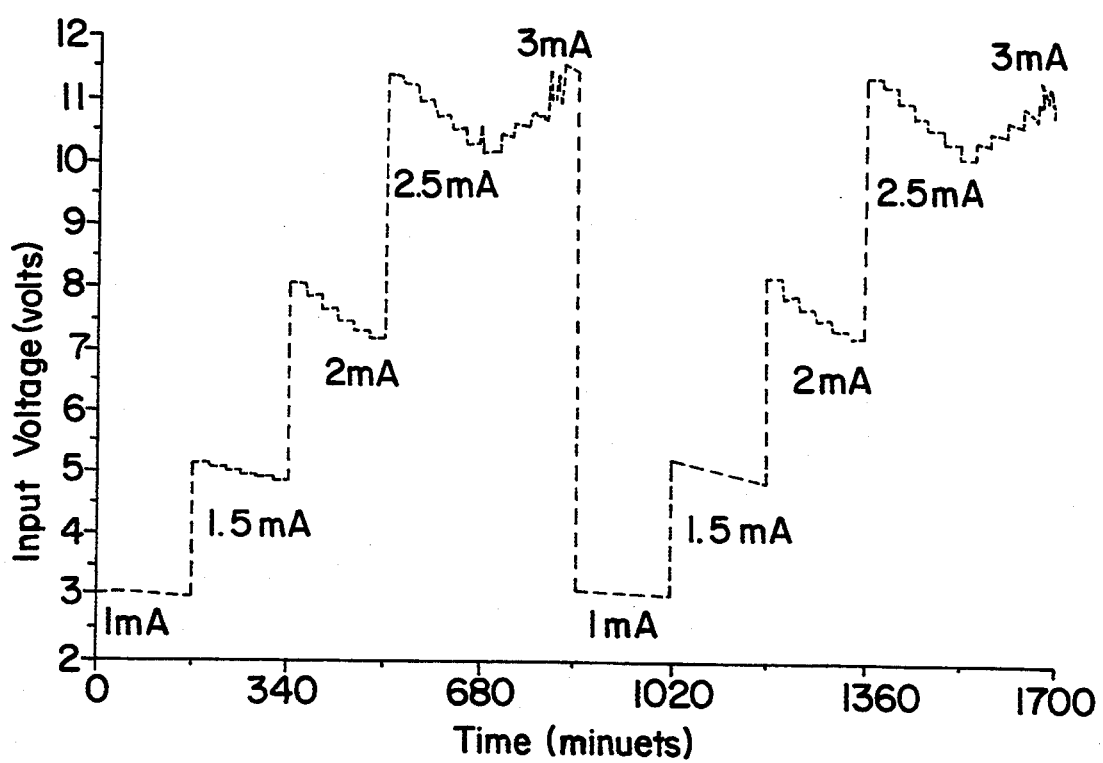
FIG. 15 is a plot illustrating sensitivity of thermistors made according to the invention and tested over a range of imposed electrical currents.

One test took 13,500 separate data points, which have been graphed in FIG. 15. The sensitivity of the device for each current range is the voltage change over the different flow rates divided by the difference in average linear velocity. The linear velocity can be found by taking the volumetric flow rate and dividing by the cross sectional area of the pipe. A relative comparison can be made by looking at the slopes of the flow areas for each different current.

The slopes all show decreasing resistance with increasing temperature with the exception of the 3 mA (10.5 volt) area, which shows increasing resistance with increasing temperature. The lower currents occurred when the device was operating in the non-intrinsic region, below 150° C. It had been originally assumed that operating below the intrinsic region would not yield adequate sensitivity, but this was not the case.

Operating the test sensor device at 1 mA and 3 volts gave a sensitivity of around 1 mV/cm/sec. This is roughly equivalent to the sensitivity of the prior art flow sensor (without the gold) operating at the 20-30 volt, 10 mA, (200–300 mW) range.

The test sensor device at 1.5 mA and 5 volts showed a sensitivity of a little over 4 mV/cm/sec. This current and voltage level is very significant, because 5 volts is a standard logic supply voltage. A device which can operate at 5 volts eliminates the need for an additional power supply to run the sensor. A current of 1.5 mA is also very significant because this current is roughly equivalent to the requirement for a single standard logic gate. This combined power requirement makes the sensor readily applicable to most control logic circuits.

The test sensor device at 2 mA and 8 volts exhibited a sensitivity of around 15 mV/cm/sec, and at 2.5 ma and 3 mA a sensitivity of about 20 mV/cm/sec was recorded. Other configurations have given sensitivity values of 65 mV/cm/sec for power requirements of 100 mW.

Operating in the non-intrinsic region opens the way to new applications for the micro-flow sensor. One of the biggest problems for a gas flow sensor is contamination on the heat transfer surface. While some contaminants can be filtered out of the flow, many contaminants will burn onto a hot sensor, eventually causing the sensor to fail. Additionally measurement applications exist for the device in potentially explosive environments, such as natural gas appliances, where a cool sensor adds to the safety of the product. Medical applications also have more use for a cooler sensor, for example a sensor under the noses of infants (as well as other patients with respiratory problems) to monitor their breathing.

While the methods herein described, and the forms of apparatus for carrying these methods into effect, constitute preferred embodiments of this invention, it is to be understood that the invention is not limited to these precise methods and forms of apparatus, and that changes may be made in either without departing from the scope of the invention, which is defined in the appended claims.

What is claimed is:

1. A miniature electronic element formed of and within a single crystal of semiconductor material, comprising top and bottom surface layers integral with said crystal and formed of an oxide of the semiconductor material, said layers being an integral part of said crystal, at least one isolated island of non-oxidized semiconductor material remaining between and integral with said top and bottom surface layers internally of said crystal, an isolating chamber formed within said crystal between said surface layers and around said island of semiconductor material to provide thermal isolation to the island of material except where said surface layers are integral with said island, and contact members attached in predetermined spaced relation to one of said top and bottom surface layers and extending through said one surface layer to said island of semiconductor material and being connected thereto in spaced relation whereby the semiconductor material of the island between said contact members provides an electrical thermistor of predetermined value between said contact members.

2. A miniature electronic element as defined in claim 1, wherein at least one of said surface layers has sufficient thickness and rigidity to provide integrity to the structure of the semiconductor crystal element.

3. A miniature electronic sensing element as defined in claim 1, further including means for applying an electric potential across said contact members so as to produce heating of said island of semiconductor material, said chamber providing a thermal barrier around said island of semiconductor material and said oxide surface layers providing a thermal barrier at the top and bottom of said island of semiconductor material, whereby changes in the ambient conditions around said sensing element will be reflected as resistance changes in said island of semiconductor material.

4. A miniature sensor element formed of a single crystal wafer of semiconductor material, comprising front and back surface layers of the oxide of the wafer material formed on said wafer integrally therewith in predetermined spaced apart locations to provide a double-walled diaphragm of predetermined thickness, a chamber formed internally of said crystal wafer between said oxide layers, said chamber surrounding and defining an island of the semiconductor material located between the walls of said diaphragm, and output means attached to said diaphragm to provide a variable sensor output in response to changes in the physical condition of said island of semiconductor material.

5. A sensor element as defined in claim 4, wherein said island of material functions as a thermistor of known value, and said output means includes electrical contacts extending through at least one of said front and back surface layers to said island for applying a predetermined electrical potential to said island of semiconductor material, whereby heat exchange through said surface layers between the heated island of material and the ambient surroundings of said sensor element will be indicative of changing of temperature differential between said island of material and the surrounding atmosphere.

* * * * *